(12) United States Patent
Slaydon (10) Patent No.: US 6,328,053 B1
(45) Date of Patent: Dec. 11, 2001

(54) AUTOMATIC ACTUATOR SYSTEM

(76) Inventor: Gary Slaydon, P.O. Box 128, Bridge City, TX (US) 77611

( * ) Notice: Subject to any disclaimer, the term of this patent is extended or adjusted under 35 U.S.C. 154(b) by 0 days.

(21) Appl. No.: 09/388,059

(22) Filed: Sep. 1, 1999

(51) Int. Cl.[7] .............................. F16K 31/04; F16K 37/00
(52) U.S. Cl. ...................... 137/15.17; 137/312; 137/554; 251/129.04; 251/129.11; 251/129.12; 251/292
(58) Field of Search .................................. 137/312, 554, 137/558, 15.17, 15.18; 251/129.11, 129.12, 292, 129.04, 291

(56) References Cited

U.S. PATENT DOCUMENTS

| | | | |
|---|---|---|---|
| 5,086,804 | * 2/1992 | Ngai | 137/312 |
| 5,440,477 | * 8/1995 | Rohrberg et al. | 137/588 |
| 5,529,089 | * 6/1996 | Hicks et al. | 137/588 |
| 5,588,461 | * 12/1996 | Plecnik | 137/312 |
| 5,794,645 | * 8/1998 | Rohrberg et al. | 137/312 |
| 5,988,206 | * 11/1999 | Bare et al. | 137/588 |

* cited by examiner

Primary Examiner—George L. Walton
(74) Attorney, Agent, or Firm—The Matthews Firm; William P. Ramey, III (57) ABSTRACT

A system for filing or discharging compressed gas or liquid cylinders mounted on the cylinder. An automatic system for filing or discharging a compressed gas cylinder, specifically chlorine, sulfur dioxide, or ammonia cylinders. The system includes an electric motor that rotates the cylinder valve system toward open or closed position without interfering with or requiring additional adapters for the filing or discharge hardware. The motor, gears, and controls are assembled as one unit to eliminate the necessity for a separate control panel or interconnecting control wires. The system has the capabilities for integral leak detection with automatic shutdown, battery backup in the event of power failure, remote control by leak detector, remote control panic button, remote low weight transmitter, remote vacuum switch for automatic switch-over systems and other remote digital signals. The system requires only a flexible power cord for trickle charge of the battery backup, which makes the assembly totally portable when not in use. Placement of the system container can be accomplished by connection to the cylinder valve, a permanent stand, or a movable stand on casters. Motor and controls are accomplished through an on-board microprocessor with integral LED displays for "CLOSED," "ALIGN," and "OPEN" indicators. Programming is accomplished through an integral keypad. Actual valve position is transmitted to the microprocessor from a direct-coupled potentiometer.

46 Claims, 6 Drawing Sheets

AUTOMATIC ACTUATOR SYSTEM

FIELD OF THE INVENTION

The present invention relates to the charging or discharging of compressed fluid cylinders.

BACKGROUND OF THE INVENTION

Various systems have been developed over the years to fill or discharge gas or liquid cylinders. As these became more and more complex, there developed a tendency to place various parts of the systems in positions remote to the actual storage cylinders themselves. In some cases certain advantages were realized, but often at the cost of more extensive wiring and piping which in some cases gives rise to safety problems The physical arrangement of the various systems has also been a factor tending to disperse the system The prior art includes many such systems, including the following:

U.S. Pat. No. 5,588,637, Carsten;
  U.S. Pat. No. 4,220,313 to Peterson, et al.;
  U.S. Pat. No. 4,541,609 to Smith;
  U.S. Pat. No. 4,647,007 to Bajka;
  U.S. Pat. No. 4,754,949 to Fukamachi;
  U.S. Pat. No. 4,790,514 to Marks; and
  U.S. Pat. No. 4,845,416 to Scholl, et al.

The above-noted Carsten patent is a good example of one such system. The Carsten system is extensive in its undertakings and complex in its details. However, Carsten has several shortcomings. In particular, in situations where a chlorinator is already mounted on a cylinder, it is necessary to remove the chlorinator and arrange for its mounting on a wall in order to employ the Carsten unit. This requirement gives rise to added piping, wiring, expense and may give rise to safety concerns.

The present invention relates to the field of valve actuation and to systems for use with pressurized fluid containers. It is often desirable to be able to shut-off automatically, under certain prescribed or predetermined conditions, a fluid flow control valve that is normally actuated manually.

Many chemicals such as chlorine, sulfur dioxide, ammonia and the like may be hazardous or toxic materials, at least under certain circumstances and by certain definitions. Many of these materials are widely distributed in pressurized containers for use in water purification, sewage treatment, and a variety of industrial, medical, and agricultural uses and applications.

These materials and operations involving them may be closely regulated by Federal, State and local governmental agencies.

The valves used in filling and dispensing these materials are generally designed to be operated manually. The containers are themselves typically left unattended for long periods of time during which they may be subject to a wide range of conditions and problems. If there is any leakage it may not be possible to approach the containers without protective measures, breathing apparatus and protective clothing.

It is therefore very desirable to have some means of closing such valves from a remote position or automatically in response to the leak or other malfunction. Such considerations may be particularly applicable to such operations as small water treatment sites which may employ pressurized chlorine cylinders as they often are not regularly staffed by skilled personnel and, at the same time, may be located in or near residential neighborhoods in which a toxic leak may be a serious matter.

Approved containers for the storage and distribution of toxic chemicals such as chlorine fall into two broad categories based on capacity:

The first group is bulk shipping containers, tanker trucks, rail cars barges and large stationary vessels; and The second group consists of two groups of containers which may be transportable to a specific application site. These are in general "cylinders" in the 50–150 pound range and "ton" containers containing as the name implies or the order of 2000 pounds of materials.

A factor in the present design is that in some cases, an actuator or chlorination unit may already be in place on a cylinder. Additionally, in other cases some elements such as a vacuum regulator, a flow meter or an ejector may be in place. In these circumstances only a fraction of an inch clearance may be available to engage the valve stem, typically ¾ inch. The present invention has been made with these problems in mind and provides for engagement of the valve stem with only ¾ inch clearance.

The present invention also provides for an onboard leak detector, which will close the valve in the case of a leak. Many systems employs vacuum system which is intended to cause air to enter the system instead of the gas leaking to the atmosphere, but not all leaks in all places will be controlled by this system and the leak detection system may still serve a valuable function, even in connection with a vacuum system.

The present invention also has the advantage of minimizing the possible leaks in change over in that the "new" cylinder need not be opened until the time of its actual use or some limited stand-by period as may be desired in any particular circumstances.

The present invention overcomes several of the problems and disadvantages of the prior art as described above by making it possible to carry the actuator and its console on the cylinder.

It is an object of the present invention to mount the actuator and its control console on or in close physical proximity to the cylinder itself.

It is a further object of the present invention to provide a system of increased safety and control.

SUMMARY

The present invention overcomes the deficiencies of the prior art and achieves its various advantages and objectives by providing for the mounting of the actuator and its control console on or in very close physical proximity to the cylinder to be filled or discharged. An automatic system for filing or discharging a compressed gas cylinder, specifically chlorine, sulfur dioxide, or ammonia cylinders. The system includes an electric motor that rotates the cylinder valve system toward open or closed position without interfering with or requiring additional adapters for the filling or discharge hardware. The motor, gears, and controls are assembled as one unit to eliminate the necessity for a separate control panel or interconnecting control wires. The system has the capabilities for integral leak detection with automatic shutdown, battery backup in the event of power failure, remote control by leak detector, remote control panic button, remote low weight transmitter, remote vacuum switch for automatic switch-over systems. And other remote digital signals. The system requires only a flexible power cord for trickle charge of the battery backup, which makes the assembly totally portable when not in use. Placement of the system container can be accomplished by connection to the cylinder valve, a permanent stand, or a movable stand on casters. Motor and controls are accomplished through an on-board microprocessor with integral LED displays for "CLOSED," "ALIGN," and "OPEN" indicators.

Programming is accomplished through an integral keypad. Actual valve position is transmitted to the microprocessor from a direct-coupled potentiometer.

DETAILED DESCRIPTION OF THE PREFERRED MODE FOR OF THE INVENTION

To place the present invention in its usual context and environment, it is necessary to review briefly several prior art items.

Figure 1:
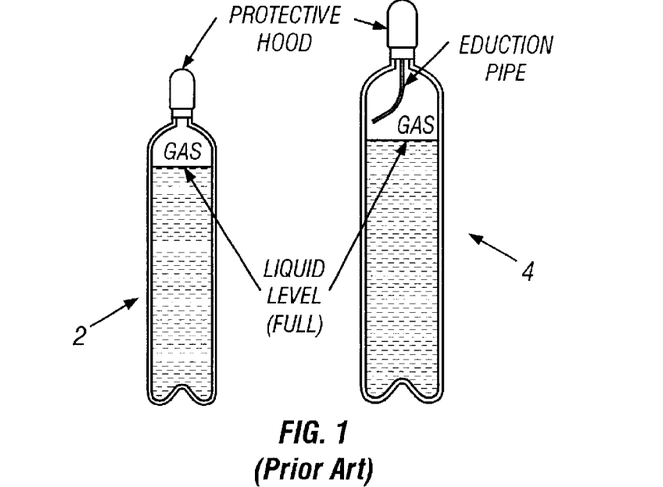
FIG. 1 illustrates a cross-sectional view of a prior art 150 pound cylinder for chlorine or sulfur dioxide and for ammonia.

As shown in FIG. 1, we see a cross-sectional view of 150 pound cylinders for chlorine 2 or sulfur and for ammonia 4. Cylinders such as these are typical of the smaller cylinders to which the present invention is applied.

Figure 2:
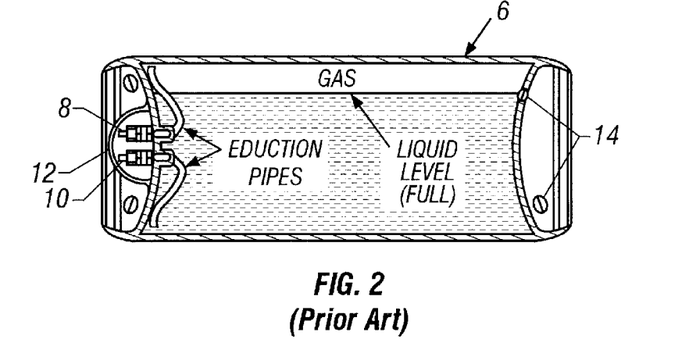
FIG. 2 illustrates a cross-sectional view of a prior art chlorine and/or sulfur dioxide "Ton" container.

The larger size cylinders to which the present invention may be applied are shown in the typical "Ton" container of FIG. 2 which might be used for chlorine or sulfur dioxide.

As shown in FIG. 2, the "Ton" container 6 is placed in a horizontal position with the upper valve 8 and the lower valve 10 in a vertical line, one above the other, with the upper valve 8 on top. The valves 8 and 10 may be protected by a protective hood 12.

In this position, gas is discharged when the upper valve 8 is open. Liquid is discharged when the lower valve 10 is open. These options are made possible by the eduction tubes or pipes shown in FIG. 2 which extend from each valve inlet (8, 10) to the side of the container 6. Fusible metal plugs 14, which melt between 158° and 165°, allow the container 6 to discharge to the atmosphere and thus, protect against rupture of the container in the event of overheating.

Figure 3:
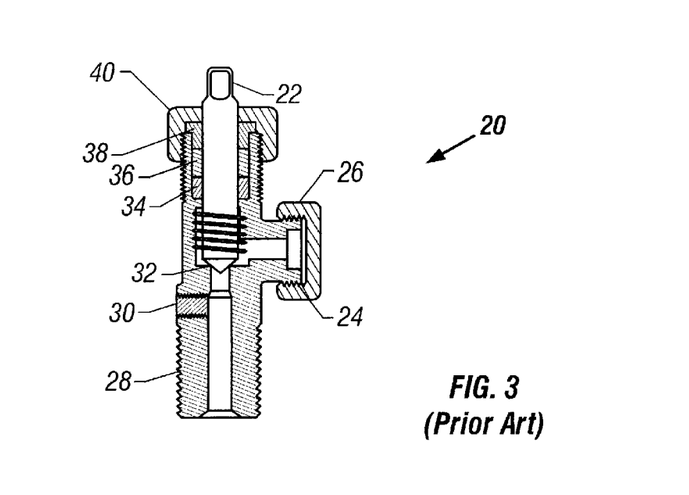
FIG. 3 illustrates a cross-sectional view of a prior art chlorine container valve.

A typical chlorine container valve 20 is shown in FIG. 3 with the top of the valve stem 22 being typically a ⅜ inch square top to provide for opening and closing by a wrench (not shown) or by similar mechanical means. The outlet 24 is provided with threads and cap 26. The valve has inlet threads 28 and a fusible metal plug 30 for safety. The valve itself has seat 32, packing washer 34, packing 36, packing gland 38, and packing nut 40.

The present invention will typically be applied to the square top of the stem 22 and may be so applied with the cylinder in the horizontal or vertical position and used on any sized tank, cylinder or container.

As noted above the present invention relates to the field of valve actuation and to systems for use with pressurized fluid containers. Under certain prescribed or predetermined conditions, it is often desirable to be able to shut-off automatically a fluid flow control valve that is normally actuated manually.

Many chemicals such as chlorine, sulfur dioxide, ammonia and the like may be hazardous or toxic materials, at least under certain circumstances and by certain definitions. Many of these materials are widely distributed in pressurized containers for use in water purification, sewage treatment, and a variety of industrial, medical, and agricultural uses and applications.

These materials and operations involving them may be closely regulated by Federal, State and local governmental agencies.

The valves used in filling and dispensing these materials are, in general, designed to be operated manually. The containers are typically left unattended for long periods of time during which they may be subject to a wide range of conditions and problems. If there is any leakage it may not be possible to approach the containers without protective measures, i.e., breathing apparatus and protective clothing.

It is therefore very desirable to have some means of closing such valves from a remote position or automatically in response to the leak or other malfunction. Such considerations may be particularly applicable to operations, such as small water treatment sites, which may employ pressurized chlorine cylinders as they often are not regularly staffed by skilled personnel and, at the same time, may be located in or near residential neighborhoods in which a toxic leak may be a serious matter.

Approved containers for the storage and distribution of toxic chemicals such as chlorine fall into two broad categories based on capacity:

The first group is bulk shipping containers, tanker trucks, rail cars, barges and large stationary vessels; and The second group consists of two groups of containers which may be transportable to a specific application site. These are, in general, "cylinders" in the 50–150 pound range and "ton" containers containing, as the name implies, on the order of 2000 pounds of materials.

A factor in the present design is that in some cases, an actuator or chlorination unit may already be in place on a cylinder. Additionally, in other cases some elements, such as a vacuum regulator, a flow meter or an ejector may be in place. In these circumstances only a fraction of an inch clearance may be available to engage the valve stem, typically ¾ inch. The present invention has been made with these problems in mind and provides for engagement of the valve stem with only ¾ inch clearance.

The present invention also provides for an onboard leak detector, which will close the valve in the event of a leak. Many systems employ a vacuum system which is intended to cause air to enter the system instead of the gas leaking to the atmosphere. Though not all leaks in all places will be controlled by this system, the leak detection system may still serve a valuable function even in connection with a vacuum system.

The present invention also has the advantage of minimizing the possible leaks in change-over in that the "new" cylinder need not be opened until the time of its actual use or some limited standby period as may be desired in any particular circumstances.

Figure 4:
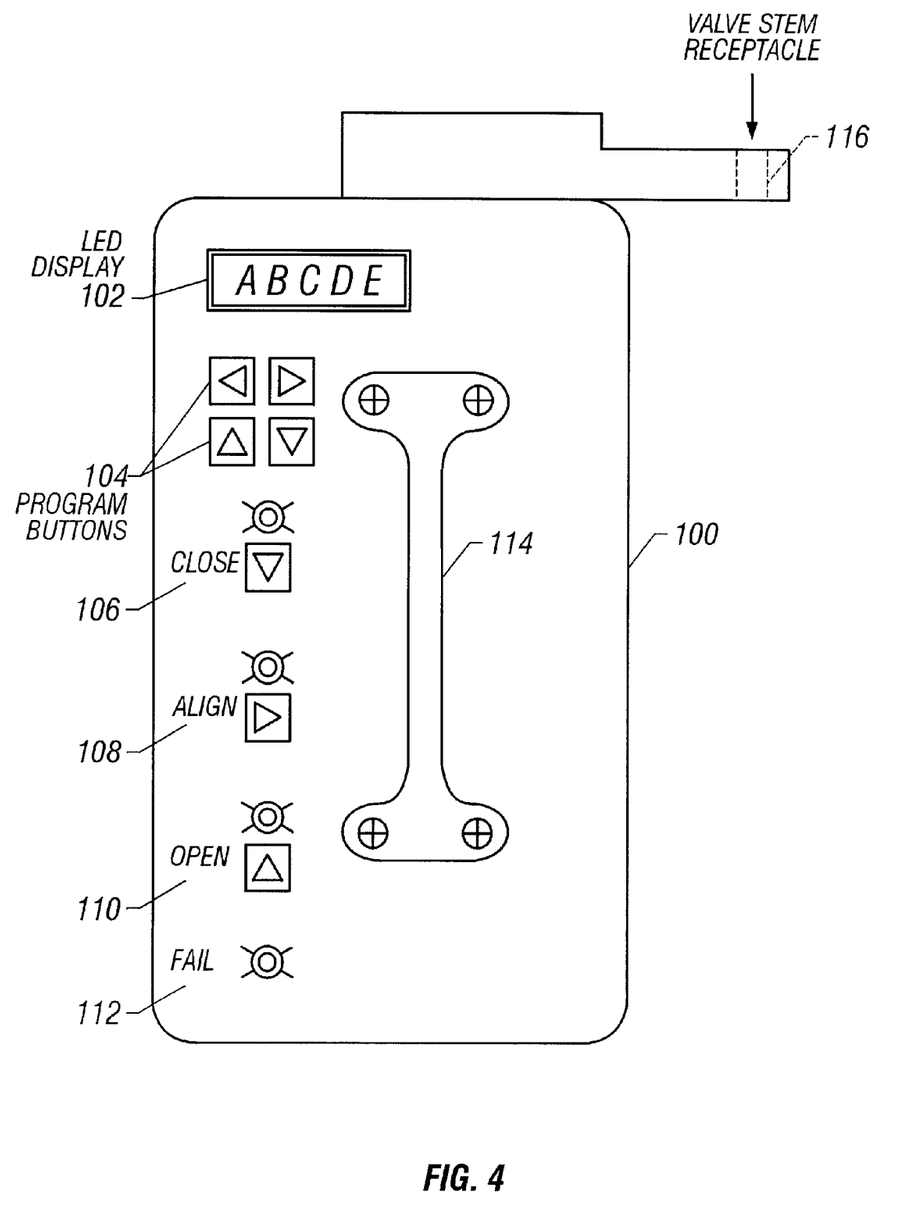
FIG. 4 illustrates a top view of the control console of the present invention.

Turning our attention now to FIG. 4, we see a top view of the operator console. A LED display 102 is provided with program buttons 104 Close switch 106, align switch 108, open switch 110 and associated indicator lights are provided, as well as a failure indicator light. The console 100 is provided with a handle 114 and has a valve stem receptacle 116.

Figure 5:
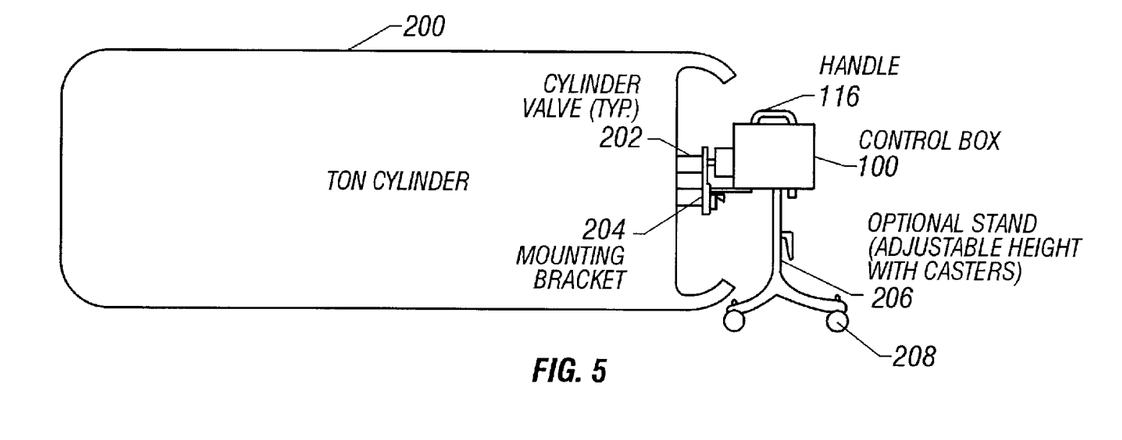
FIG. 5 illustrates a side view of the "ton cylinder" embodiment of the present invention.
Figure 6:
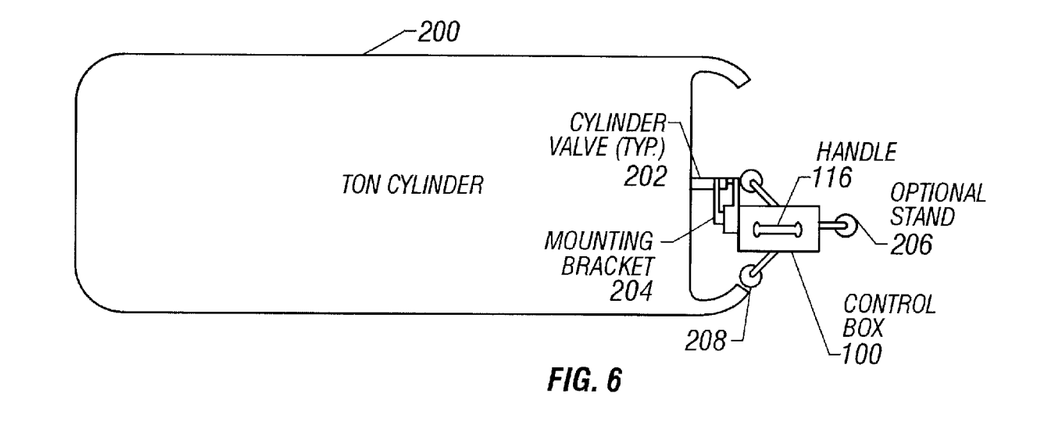
FIG. 6 illustrates a top view of the "ton cylinder" embodiment of the present invention

FIGS. 5 and 6 show side and top views, respectively, of a "ton" cylinder 200. Cylinder valve 202 is engaged in the valve stem receptacle 116 (of FIG. 4) of control box or console 100 with handle 116 as shown in FIGS. 5 and 6. The engagement is secured by mounting bracket 204. The control box 100 is supported by an optional stand 206 which is adjustable in height and mounted on casters 208.

Figure 7:
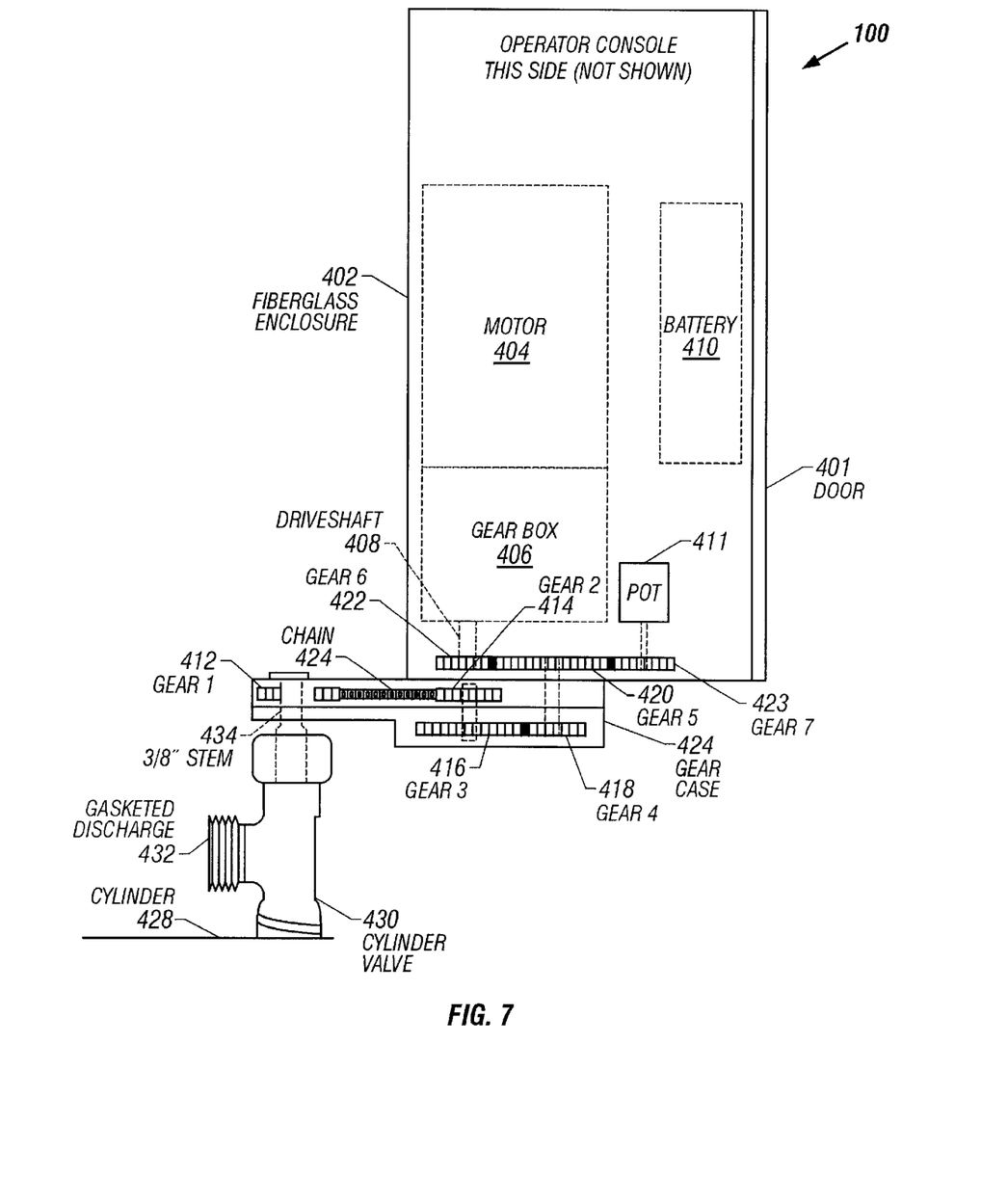
FIG. 7 illustrates the present invention mounted on top of a cylinder in accordance with the teachings of the present invention.

As may be seen in FIG. 7, the operator console 100 consists of a fiberglass enclosure 402 with door 401.

Within the enclosure 402 a motor 404 is operatively connected with gear box 406 which via drive shaft 408 is connected to gears 1–7, which are numbered as 412,414, 416,418,420,422, and 423, respectively, and contained as shown within gear case 424. Gears 414 and 422 are operatively connected by chain 424 which drives gear 412 which is operatively connected with and to valve stem 434 which is typically a ⅜ inch stem coming out of cylinder valve 430 which has a gasketed discharge 432. The valve 430 is, of course, mounted on the fluid cylinder 428. The stem 434 passes through valve stem receptacle 116 as shown in FIG. 4 and the present FIG. 7, where it is omitted to permit the showing of other detail. A battery back-up 410 is provided and position information regarding stem 434 is obtained by means of potentiometer 411 for processing by the microprocessor (not shown in this view) associated with this console 100.

Figure 8:
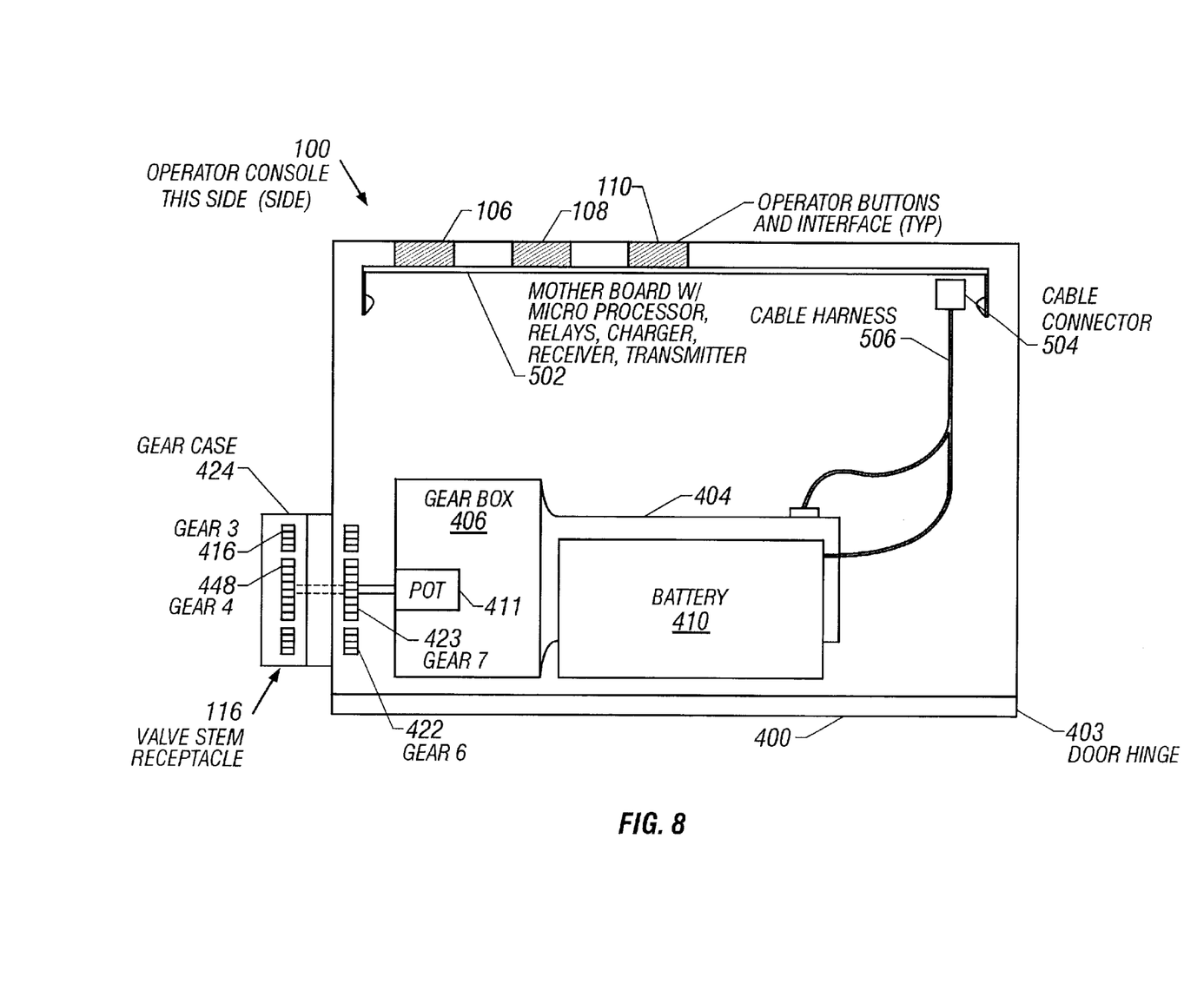
FIG. 8 illustrates a side view of the present invention.

FIG. 8 is a side view of operator console 100 with operator buttons as previously identified 106, 108, 110 and on the opposite side door 400 which is mounted on door hinge 403. Cable connector 504 is connected to cable harness 506, which is connected to motor 404 and battery 410, with the motor 404 being engaged with gear box 406 and with gear case 424 contains or is connected to the gears 422, 423, 416, and 418. The gears provide the live power to valve stem 434 (not shown in this view) which passes through valve stem receptacle 116 to be engaged by the gear train and to permit position measurement via potentiometer 411 for processing by mother board 502 with microprocessor, relays, charger, receiver, and transmitter (not shown in detail).

Figure 9:
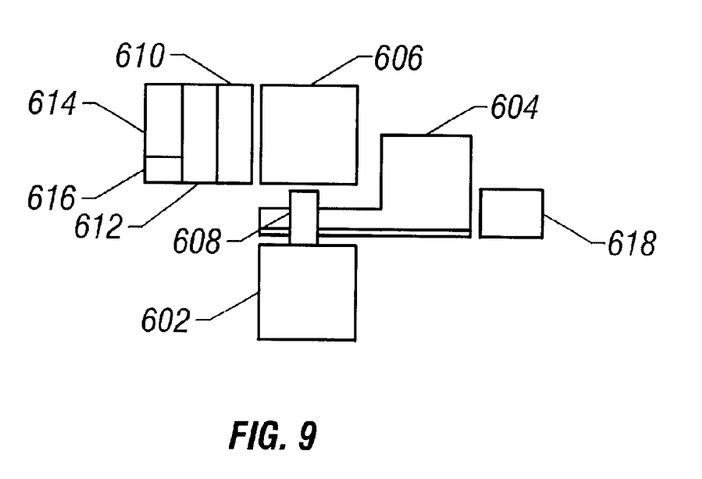
FIG. 9 is a block diagrammatic representation of a preferred embodiment of the present invention.

FIG. 9 shows, in the form of a block diagram, the cooperation of several of the elements of the present invention. The cylinder (containing the fluid to be ejected) 602 has a valve stem 608 which is operatively engaged by the automatic actuator and its console 604. Other components of the actuator system may be included within the console 604 or in some cases may reside outside the enclosure of 604 as is indicated at 606. Depending on specific configurations elements such as the vacuum regulator 610, ejector 612, flowmeter 614, rate valve 616, and leak detector 618 may be included in the enclosure of 604 or 606 or may, in some cases, be located outside of either or both.

To summarize the present invention, it relates to a system for filling or discharging compressed gas or liquid cylinders mounted on the cylinder. An automatic system for filling or discharging a compressed gas cylinder, specifically chlorine, sulfur dioxide, or ammonia cylinders is disclosed. The system includes an electric motor that rotates the cylinder valve system toward open or closed positions without interfering with or requiring additional adapters for the filing or discharge hardware. The motor, gears, and controls are assembled as one unit to eliminate the necessity for a separate control panel or interconnecting control wires. The system has the capabilities for integral leak detection with automatic shutdown, battery backup in the event of power failure, remote control by leak detector, remote control panic button, remote low weight transmitter, remote vacuum switch for automatic switch-over systems and other remote digital signals. The system requires only a flexible power cord for trickle charge of the battery backup, which makes the assembly totally portable when not in use. Placement of the system container can be accomplished by connection to the cylinder valve, a permanent stand, or a movable stand on casters. Motor and controls are accomplished through an on-board microprocessor with integral LED displays for "CLOSED," "ALIGN," and "OPEN" indicators. Programming is accomplished through an integral keypad. Actual valve position is transmitted to the microprocessor from a direct-coupled potentiometer.

The invention features an actuator to open and close the valve of a fluid-containing cylinder by rotation of the valve stem, capable of being installed and operating on a cylinder already having one or more items selected from the group consisting of:

a vacuum regulator;

an ejector;

a flow meter;

a rate valve;

actuator component; or combination thereof, installed on the cylinder.

Engagement with the valve stem is operatively connected to a motor within the said actuator. The actuator is held in position by a stand and is battery powered. The valve position is determined by a potentiometer and the valve is closed in response to a signal from a leak detector.

SCOPE OF INVENTION

The operation of the present invention takes place within the context of the general operation of actuators such as chlorinators, sulfonators, ammoniators and the like. In such systems, the gas from the cylinders enters a manifold where it is filtered and heated to evaporate any liquid which may be present. Water flowing through the ejector creates a vacuum which opens an inlet valve to admit the gas to the regulator.

The gas passes through a flowmeter, the rate control valves and then to the ejector where it is thoroughly mixed and dissolved in the water and carried to the application point.

In the operation of the specific disclosed embodiment of the present invention, the stem valve is closed and the controller set accordingly. The mounting brackets are set, then the "ALIGN" button on the controller is pushed and held until the controller valve receptacle seats on the valve stem. The controller records the actual closed valve position. The safety devices are then checked for proper installation and operation. The pressing of the "OPEN" button then and thereafter opens the valve. The proper operation of the leak detector, "CLOSE" and "PANIC" buttons, and any other remote alarms, may then be tested.

Operationally, the present invention involves the method of opening and closing the valve of a fluid-containing cylinder by an actuator rotating a valve stem comprising:

a. installing said actuator on said cylinder where said cylinder already has one or more of the items selected from the group consisting of:

a vacuum regulator;

an ejector;

a flow meter;
a rate valve;
an other actuator; or
part thereof; and b. operating said actuator on said cylinder where said cylinder has one or more of the items selected from the group consisting of the items listed in step a) above.

The stem is operatively connected to a motor within the said actuator which may held in place by a stand. The actuator is operated by a battery and the valve position is determined by a potentiometer. The valve is closed in response to a signal from a leak detector.

While a specific preferred embodiment has been disclosed as required by the patent laws, and while this disclosure reflects the inventor's conception of the best mode of implementing his invention as presently contemplated by him, there are any number of alternatives contemplated by the inventor that are within the spirit and scope of the invention which the inventor intends to disclose.

For example, while gears are shown, it is clear that belts and various combinations of belts, wheels, and other devices, either alone or in combination with gears, may be employed.

To take another example while a battery is disclosed, it is clear that a solar cell may be employed to equal advantage.

The terms and expressions employed are used in a descriptive and not a limiting sense, and there is no intent to exclude such equivalents of the invention, or any portion thereof, as falls within the purview of the claims.

What is claimed is:

1. An actuator to open and close a valve of a fluid containing cylinder by rotation of the valve stem, capable of being removably installed on the valve of the cylinder wherein the valve already has one or more items installed on the cylinder valve, for preventing certain hazardous conditions, selected from the group consisting of:
   a vacuum regulator;
   an ejector;
   a flow meter;
   a rate valve; and
   any other actuator, actuator component, chlorinator or combination thereof.

2. The actuator of claim 1 wherein the engagement of the valve stem is operatively connected to a motor within the actuator.

3. The actuator of claim 1 wherein the actuator is supported by an item selected from the group consisting of a stand and mounting bracket.

4. The actuator of claim 1 wherein the actuator is powered by a battery.

5. The actuator of claim 1 wherein the valve position is determined by a potentiometer.

6. The actuator of claim 1 wherein the valve position is determined relative to a position where the valve is at least partially open.

7. The actuator of claim 1 wherein the valve position is determined relative to a position where the valve is at least partially closed.

8. The actuator of claim 6 wherein the valve is fully open.

9. The actuator of claim 7 wherein the valve is fully closed.

10. The actuator of claim 1 wherein the actuator further comprises a leak detector.

11. The actuator of claim 1 or 10 wherein the actuator is closed in response to a leak.

12. The actuator of claim 1 wherein the valve position is rotated by remote control.

13. The actuator of claim 1 wherein the cylinder is in a position selected from the group consisting of substantially horizontal and substantially vertical.

14. The actuator of claim 1 wherein the actuator may be installed on the valve stem in a confined space.

15. The actuator of claim 1 wherein the actuator is controlled by a microprocessor.

16. The actuator of claim 1 wherein the actuator is aligned in a position wherein the valve is open.

17. The actuator of claim 1 wherein the actuator is aligned in a position wherein the valve is closed.

18. An actuator to open and close a valve of a fluid containing cylinder by rotation of the valve stem, capable of being removably installed on the valve of the cylinder comprising:
   means for attaching the actuator to the valve stem of the valve when at least one of a device, for preventing certain hazardous conditions, selected from the group consisting of a vacuum regulator; an ejector; a flow meter; a rate valve; and any other actuator, actuator component, chlorinator or combination thereof, is already installed; and
   means for rotating the valve stem.

19. The actuator of claim 18 further comprising means for automatically rotating the valve stem.

20. The actuator of claim 18 wherein the actuator is aligned in a position wherein the valve is closed.

21. The actuator of claim 18 wherein the actuator is aligned in a position wherein the valve is open.

22. The actuator of claim 18 wherein the valve is on a cylinder.

23. The actuator of claim 18 wherein the actuator is supported by an item selected from the group consisting of a stand and mounting bracket.

24. The actuator of claim 18 wherein the actuator is not in communication with the fluid in the fluid containing vessel.

25. The actuator of claim 18 wherein the valve is operated by remote control.

26. The actuator of claim 18 further comprising a leak detector whereby when a leak is detected, the valve stem is rotated to a closed position.

27. The actuator of claim 18 further comprising a leak detector that notifies an operator when a leak is detected.

28. A method for automatically rotating a valve stem with an actuator that is removably installed on the valve of a cylinder wherein the valve already has a device, for preventing certain hazardous conditions, selected from the group consisting of a Vacuum regulator; an ejector; a flow meter; a rate valve; and any other actuator, actuator component, chlorinator or combination thereof comprising the steps of:
   installing an actuator to the valve stem of the valve; and
   operating the actuator.

29. The method of claim 28 wherein the step of operating the valve is performed remotely.

30. The method of claim 28 further comprising the step of aligning the actuator when the valve is in an open position.

31. The method of claim 28 further comprising the step of aligning the actuator when the valve is in a closed position.

32. The method of claim 28 further comprising the step of detecting leaks.

33. The method of claim 32 further comprising the step of closing the valve in response to a leak.

34. The method of claim 32 further comprising the step of notifying an operator in response to a leak.

35. The method of claim 30 or 31 wherein the step of aligning the actuator is performed with a potentiometer.

36. The method of claim 28 further comprising the step of supporting the actuator with a device selected from the group consisting of a mounting bracket and a stand.

37. The method of claim 28 further comprising the step of closing the valve.

38. The method of claim 28 further comprising the step of opening the valve.

39. A system that is removably attached to a valve for rotating a valve stem of the valve on a fluid containing cylinder that already has installed on tee valve a device, for preventing certain hazardous conditions, selected from the group consisting of a vacuum regulator; an ejector; a flow meter; a rate valve; and any other actuator, actuator component, chlorinator or combination thereof comprising:

means for attaching the actuator to the valve stem; and means for rotating the valve stem.

40. The system of claim 39 further comprising means for determining the valve position.

41. The system of claim 39 wherein the means for rotating the valve stem is controlled via remote control.

42. The system of claim 39 further comprising a leak detector.

43. The system of claim 42 wherein the valve stem is rotated to a closed position when a leak is detected.

44. The system of claim 39 wherein the means for rotating the valve stem is aligned in a closed position.

45. The system of claim 39 wherein the means for rotating the valve stem is aligned in an open position.

46. A portable motorized controller for removable attachment to a valve stem of a valve on a cylinder that already has installed on the valve a device, for preventing certain hazardous conditions, selected from the group consisting of a vacuum regulator; an ejector; a flow meter; a rate valve; and another actuator, actuator component, chlorinator or combination thereof comprising:

means for attaching the actuator to the valve stem; and means for rotating the valve stem.

* * * * *